United States Patent
Filipp et al.

(10) Patent No.: US 10,467,544 B2
(45) Date of Patent: Nov. 5, 2019

(54) MULTI-QUBIT TUNABLE COUPLING ARCHITECTURE USING FIXED-FREQUENCY SUPERCONDUCTING QUBITS

(71) Applicant: International Business Machines Corporation, Armonk, NY (US)

(72) Inventors: Stefan Filipp, Zurich (CH); Jay Gambetta, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 835 days.

(21) Appl. No.: 14/985,529

(22) Filed: Dec. 31, 2015

(65) Prior Publication Data

US 2017/0193388 A1    Jul. 6, 2017

(51) Int. Cl.
*G06N 10/00*    (2019.01)
*G06F 15/82*    (2006.01)

(52) U.S. Cl.
CPC ............. *G06N 10/00* (2019.01); *G06F 15/82* (2013.01)

(58) Field of Classification Search
CPC ...... G06N 99/002; G06N 10/00; G06F 15/82; G06F 13/4068
See application file for complete search history.

(56) References Cited

U.S. PATENT DOCUMENTS 7,268,576 B2    9/2007   Amin
7,332,738 B2    2/2008   Blais et al.
7,847,615 B2   12/2010   Yorozu et al.

(Continued)

FOREIGN PATENT DOCUMENTS

AU    2016201293    3/2016
CA     2819365     6/2012

(Continued)

OTHER PUBLICATIONS

Srinivasan et al., "Tunable Coupling in Circuit Quantum Electrodynamics Using a Superconducting Charge Qubit with a V-Shaped Energy Level Diagram", Feb. 25, 2011, Physical Review Letters, pp. 1-4 (Year: 2011).*

(Continued)

*Primary Examiner* — Kamran Afshar
*Assistant Examiner* — Brent Johnston Hoover
(74) *Attorney, Agent, or Firm* — Fleit Gibbons Gutman Bongini Bianco PL; Donna Flores

(57) ABSTRACT

Various embodiments provide a coupling mechanism, method of activation and a square lattice. The coupling mechanism comprises two qubits and a tunable coupling qubit that activates an interaction between the two qubits by modulation of a frequency of the tunable coupling qubit. The tunable coupling qubit capacitively couples the two qubits. The tunable coupling qubit is modulated at a difference frequency of the two qubits. The difference frequency may be significantly larger than an anharmonicity of the two qubits. The tunable coupling qubit may be coupled to the two qubits by two electrodes separated by a superconducting quantum interference device (SQUID) loop having two Josephson junctions or by a single electrode with a SQUID loop coupling to ground. The SQUID loop is controlled by an inductively-coupled flux bias line positioned at the center of the tunable coupling qubit.

22 Claims, 3 Drawing Sheets

(56) References Cited

U.S. PATENT DOCUMENTS

| | | | |
|---|---|---|---|
| 8,111,083 | B1 | 2/2012 | Pesetski et al. |
| 8,642,998 | B2 | 2/2014 | Gambetta et al. |
| 8,872,360 | B2 | 10/2014 | Chow et al. |
| 8,975,912 | B2 | 3/2015 | Chow et al. |
| 2004/0000666 | A1* | 1/2004 | Lidar .................. B82Y 10/00 257/31 |
| 2012/0144159 | A1 | 6/2012 | Pesetski et al. |
| 2014/0203838 | A1 | 7/2014 | Pesetski et al. |
| 2014/0235450 | A1 | 8/2014 | Chow et al. |
| 2015/0028970 | A1 | 1/2015 | Chow et al. |
| 2016/0267032 | A1 | 9/2016 | Rigetti et al. |
| 2016/0292586 | A1* | 10/2016 | Rigetti ................ G06N 99/002 |
| 2016/0292587 | A1 | 10/2016 | Rigetti et al. |
| 2016/0335558 | A1* | 11/2016 | Bunyk .................. G06F 15/82 |

FOREIGN PATENT DOCUMENTS

| | | |
|---|---|---|
| EP | 2863342 | 4/2015 |
| JP | 2014503880 | 2/2014 |
| JP | 2015028786 | 2/2015 |
| JP | 2016170800 | 9/2016 |
| WO | 2012074752 | 6/2012 |
| WO | 2015178990 | 11/2015 |
| WO | 2015178991 | 11/2015 |

OTHER PUBLICATIONS

Gambetta et al., "Superconducting Qubit with Purcell Protection and Tunable Coupling", Jan. 21, 2011, Physical Review Letters, pp. 1-4 (Year: 2011).*

Alicki et al., "Strong-coupling BCS models of Josephson qubits", Dec. 10, 2012, Journal of Physics: Condensed Matter, pp. 1-10 (Year: 2012).*

Sadiek et al., "Entanglement of a two-qubit system with anisotropic XYZ exchange coupling in a nonuniform time-dependent external magnetic field", Feb. 2009, Physica B, pp. 1719-1728 (Year: 2009).*

Shanks et al., "A scanning transmon qubit for strong coupling circuit quantum electrodynamics", Mar. 8, 2013, Nature Communications, pp. 1-6 (Year: 2013).*

Johnson et al., "Heralded State Preparation in a Superconducting Qubit", Aug. 3, 2012, Physical Review Letters, pp. 1-5 (Year: 2012).*

Zagoskin et al., "Superconducting qubits", May 1, 2008, Physics in Canada, v.63, pp. 1-33 (Year: 2008).*

Larsen et al., "Semiconductor-Nanowire-Based Superconducting Qubit", Sep. 18, 2015, Physical Letter Reviews, PRL 115, 127001, pp. 1-5 (Year: 2015).*

International Search Report and Written opinion dated Dec. 28, 2016, received for International Application No. PCT/IB2016/056008.

Anderson, P.W., "The Resonating Valence Bond State in La2 CuO4 and Superconductivity", Science, New Series, Mar. 6, 1987, pp. 1-5, vol. 235, No. 4793.

Balents, L., "Spin Liquids in Frustrated Magnets", Nature, Mar. 11, 2010, pp. 1-10, vol. 464.

Bertet, P., et al., "Parametric Coupling for Superconducting Qubits", Physical Review B, Feb. 2006, pp. 1-6, vol. No. 73, No. 6.

Blais, A., et al., "Quantum-information Processing with Circuit Quantum Electrodynamics", Physical Review A, Mar. 2007, pp. 1-21, vol. 75, No. 3.

Chow, J.M., et al., "Simple All-Microwave Entangling Gate for Fixed-Frequency Superconducting Qubits", Physical Review Letters, Aug. 17, 2011, pp. 1-5, vol. 107, No. 8.

Cross, A.W., et al., "Optimized Pulse Shapes for a Resonator-Induced PHASE Gate", Physical Review A, Mar. 2015, pp. 1-12, vol. 93, No. 1.

Dewes, A., et al., "Characterization of a Two-Transmon Processor with Individual Single-Shot Qubit Readout", Physical Review Letters, Feb. 2, 2012, pp. 1-5, vol. 108, No. 5.

Filipp, S., et al, "Preparation of Subradiant States Using Local Qubit Control in Circuit QED", Physical Review A, Dec. 2011, pp. 1-4, vol. 84, No. 6.

Jin, J., et al., "Photon Solid Phases in Driven Arrays of Nonlinearly Coupled Cavities", Physical Review Letters, Apr. 18, 2013, pp. 1-5, vol. 110, No. 16.

Koch, J., et al., "Charge-insensitive Qubit Design Derived from the Cooper Pair Box", Physical Review A, Oct. 2007, pates 1-19, vol. 76, No. 4.

Majer, J., et al., "Coupling Superconducting Qubits via a Cavity Bus", Nature, Sep. 27, 2007, pp. 1-5, vol. 449.

Niskanen, A.O., et al., "Quantum Coherent Tunable Coupling of Superconducting Qubits", Science, May 4, 2007, pp. 1-5, vol. 316.

Pechal, M., et al., "Geometric Phase and Nonadiabatic Effects in an Electronic Harmonic Oscillator", Physical Review Letters, Apr. 23, 2012, pp. 1-5, vol. 108, No. 17.

Poletto, S., et al., "Entanglement of Two Superconducting Qubits in a Waveguide Cavity via Monochromatic Two-Photon Excitation", Physical Review Letters, Dec. 11, 2012, pp. 1-5, vol. 109, No. 24.

Salathe, Y., et al., "Digital Quantum Simulation of Spin Models with Circuit Quantum Electrodynamics", Physical Review X, Jun. 17, 2015, pp. 1-12.

Strauch, F.W., et al., "Quantum Logic Gates for Coupled Superconducting Phase Qubits", Physical Review Letters, Oct. 16, 2003, pp. 1-4, vol. 91, No. 16.

De Groot, P.C., et al., "Selective Darkening of Degenerate Transitions Demonstrated with Two Superconducting Quantum Bits", Nature Physics, Aug. 1, 2010, pp. 1-4.

Chow, J.M., et al., "Microwave-activated conditional-phase gate for superconducting qubits", New Journal of Physics, Nov. 2013, pp. 1-11, vol. 15.

Leek, P.J., et al., "Using Sideband Transitions for Two-Qubit Operations in Superconducting Circuits", Physical Review B, May 29, 2009, pp. 1-4, vol. 79, No. 18.

Harrabi, K., et al., "Engineered Selection Rules for Tunable Coupling in a Superconducting Quantum Circuit", Physical Review B, Jan. 2009, pp. 1-4, vol. 179. No. 2.

* cited by examiner

MULTI-QUBIT TUNABLE COUPLING ARCHITECTURE USING FIXED-FREQUENCY SUPERCONDUCTING QUBITS

GOVERNMENTAL RIGHTS

This invention was made with Government support under Contract No.: W911NF-14-1-0124 awarded by the Army Research Office (ARO). The Government has certain rights in this invention.

BACKGROUND

The present disclosure generally relates to superconductors, and more particularly relates to a multi-qubit tunable coupling architecture using superconducting qubits.

Quantum computation is based on the reliable control of quantum bits. The fundamental operations required to realize quantum algorithms are a set of single-qubit operations and one two-qubit operations which establish correlations between two separate quantum bits. The realization of high fidelity two-qubit operations is required both for reaching the error threshold for quantum computation and for reaching reliable quantum simulations.

Currently for superconducting qubits the single-qubit gates and are implemented with microwave controls. There are three main types of two qubit gates: 1) gates based on tunable frequency qubits, 2) gates based on microwave-driven qubits (e.g., cross-resonance, flick fork, Bell Rabi, MAP, sideband transitions, and 3) gates based on geometric phases (e.g., resonator-induced phase gate, holonomic gates).

For gates based on tunable frequency qubits, the qubits themselves are tuned in frequency to activate a resonant interaction. These gates essentially have two operating points: an 'off'-position with essentially zero coupling and an 'on' position when the qubits have a strong two-qubit interaction. These gates have a very good on-off ratio, but because the qubits are tunable via externally applied magnetic flux, they can be limited by 1/f noise which limits the coherence of the qubits to a few microseconds.

For gates based on microwave-driven qubits, the qubits can be designed to be fixed in frequency so they are immune to flux noise. However, to activate the gate requires microwave pulses. The problems with these gates are that they have a low on/off ratio and are very hard to address the gate of interest without activating unwanted interactions.

Gates based on geometric phases are based on the path of the quantum state in its state space and the acquired quantum phase associated with this excursion. Adiabatic geometric gates are robust against certain types of noise, but are generally slow and require the controls to adiabatic. Non-adiabatic gates can be faster and potentially share the noise-resilience of their adiabatic cousins.

BRIEF SUMMARY

In one embodiment, a coupling mechanism is disclosed. The coupling mechanism comprises two qubits and a tunable coupling qubit that activates an interaction between the two qubits by modulation of a frequency of the tunable coupling qubit.

In another embodiment, a method of activating a coupling mechanism is disclosed. The method comprises positioning a tunable coupling qubit between two qubits and modulating the frequency of the tunable coupling qubit.

In another embodiment, a square lattice of superconducting gates is disclosed. The square lattice comprises a plurality of unit cells. Each unit cell comprises two or more qubits and a tunable coupling qubit that activates an interaction between a pair of qubits of the two or more qubits by modulation of a frequency of the tunable coupling qubit.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

In this disclosure, a new quantum gate is proposed. The new gate includes a mechanism for a two-qubit gate, which takes advantage of fixed-frequency transmons with long coherence times, and an additional tunable-frequency coupling element, which may also be realized by a transmon, having the potential to outperform existing gates and allowing the realization of a scalable platform for quantum computation and simulation.

Figure 1:
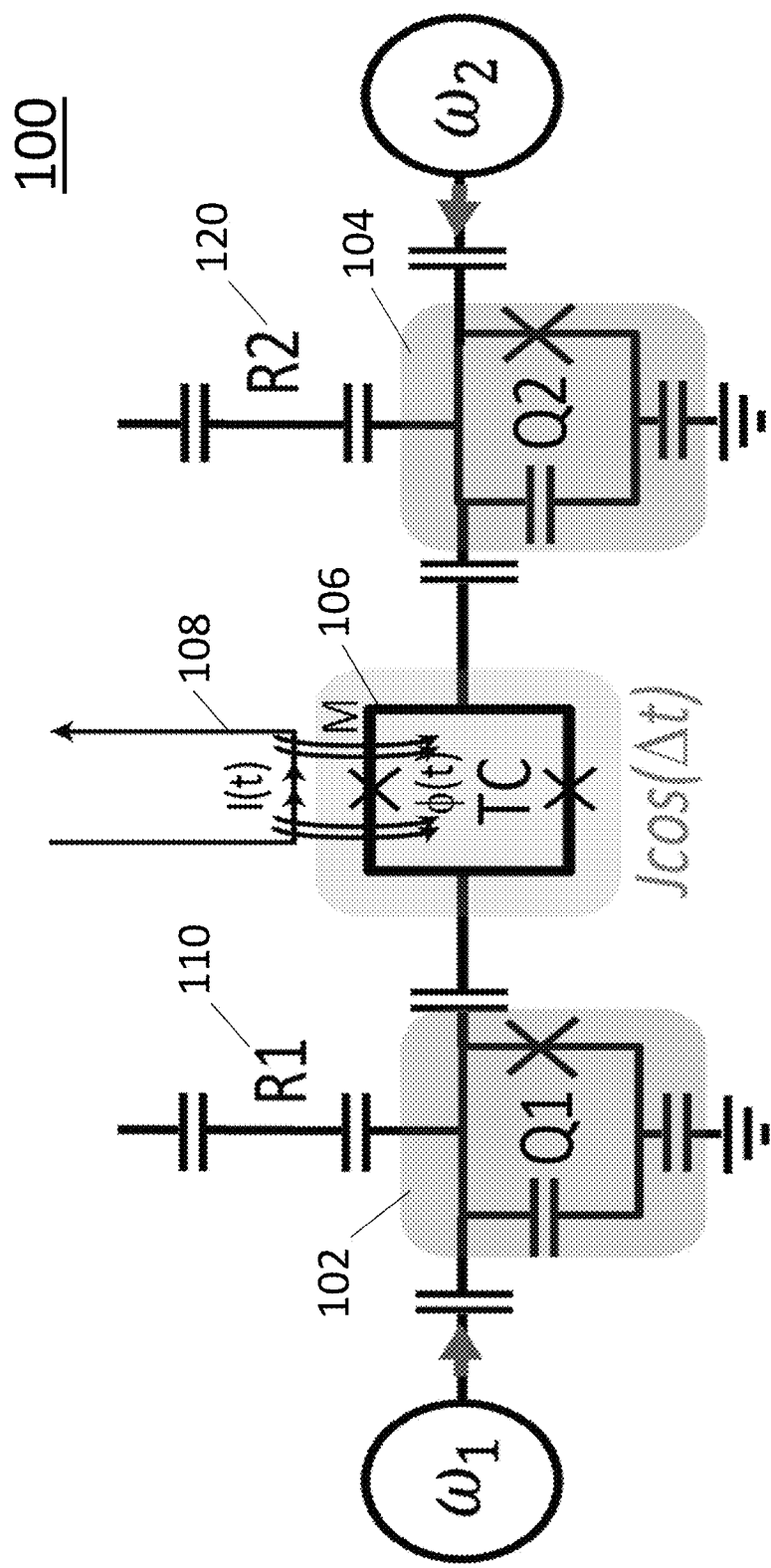
FIG. 1 is a circuit diagram of an example multi-qubit tunable coupling architecture according to one embodiment of the present disclosure.

Referring now to FIG. 1, a multi-qubit tunable coupled gate 100 is based on two fixed frequency single-junction superconducting qubits 102, 104 with long coherence times (e.g., transmon-type devices) as the basis computational elements and an ancilla qubit 106 (also referenced as a coupling qubit 106) acting as frequency-tunable coupling element. The ancilla qubit 106 is laid out as an harmonic oscillator circuit, such as the transmon type qubit, but with an extra degree freedom in the form of an extra Josephson junction forming a superconducting quantum interference device (SQUID) loop which allows for the tuning of the coupler's frequency. The frequency modulation is realized by altering the magnetic flux $\phi(t)$ penetrating the SQUID loop formed by the two Josephson junctions via a current I(t) passed through an inductively coupled flux bias line 108. The frequency modulation induces a modulation of the coupling strength $J(t)=J \cos(\Delta t)$. Each qubit 102, 104 is capacitively coupled to a readout resonator 110, 112 (i.e. R1 & R2) and a charge bias line (not shown) for single qubit gate operations.

The ancilla qubit coupler 106 activates a two-qubit gate between selected qubits 102, 104. The coupling is performed by modulating the frequency of the ancilla qubit coupler 106 near or at the frequency difference of the other two qubits 102, 104 and as such, the coupler qubit 106 activates an exchange-type interaction between the two qubits 102, 104 that either swaps the excitation between the qubits 102, 104

(e.g., transverse (XY) interaction for variable-frequency flux qubits) or induces a state-dependent phase shift on either of the qubits 102, 104 (e.g., longitudinal (ZZ) interaction). The tunable coupling scheme allows two-qubit quantum gate implementation based on both the transverse XY and the longitudinal ZZ interaction.

Figure 2:
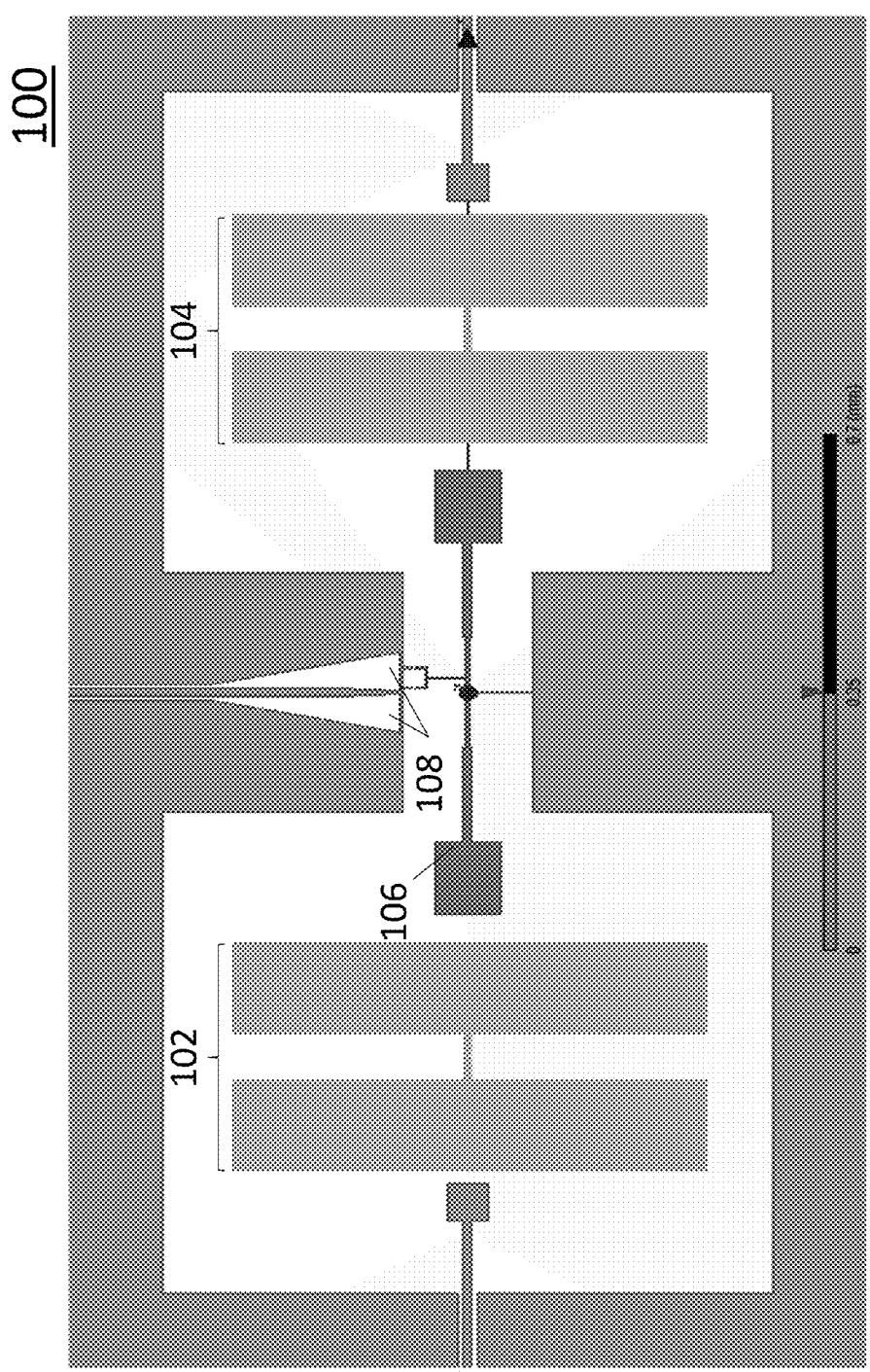
FIG. 2 is example geometry for multi-qubit tunable coupling architecture using two transmon-type qubits coupled via a third transmon qubit acting as a frequency-tunable coupling element according to one embodiment of the present disclosure.

The ancilla qubit 106 couples to two (or more) transmons 102, 104 by either separate electrodes separated by a SQUID loop containing two Josephson junctions, or by a single electrode with a SQUID loop coupling to ground. FIG. 2 shows example geometry for two transmon-type qubits 102, 104 coupled via a third transmon 106 acting as a frequency-tunable coupling element. External magnetic flux applied via the inductively-coupled bias line 108 threads the SQUID loop at the center of the tunable coupler and modifies its frequency by modifying the effective Josephson inductance. The symmetric placement of the flux-bias line 108 inhibits the decay of the coupling transmon 104 by minimizing the capacitive coupling to the flux-line 104.

Without external control fields, the dynamics of the two-qubit system 100—neglecting the dynamics of the tunable coupler 104 with transition frequency $\omega_{tc}$—follows the Hamiltonian equation:

$$H/\hbar = \frac{\omega_1}{2}\sigma_z^{(1)} + \frac{\omega_2}{2}\sigma_z^{(2)} + J/2(\sigma_x^{(1)}\sigma_x^{(2)} + \sigma_y^{(1)}\sigma_y^{(2)}) \quad [1]$$

with the qubit frequencies $\omega_1$ and $\omega_2$, the usual Pauli operators $\sigma_{x,y,z}^{(j)}$ on qubit j=1,2 and the coupling strength J. This coupling is mediated via virtual photons populating the tunable coupling element 104 and is given by $$J = \frac{g_1 g_2}{2}\left(\frac{1}{\delta_{1r}} + \frac{1}{\delta_{2r}}\right),$$

where $g_{1,2}$ is the qubit-coupler coupling strength. This interaction occurs naturally in a cavity quantum electrodynamics (QED) setting for qubits coupled to a common mode. When the qubits 102, 104 are detuned from each other and from the coupler, (i.e. with the qubit-coupler detuning $\delta_{itc}=\omega_i-\omega_{tc}\neq 0$ (i=1,2) and the qubit-qubit detuning $\delta_{12}=\omega_2-\omega_1\neq 0$), the swap probability $p_{12}$ is suppressed by the inverse of the qubit-resonator times the qubit-qubit detuning squared, (i.e. $p_{12} \propto 1/\delta_{itc}^2 \delta_{12}^2$), thus ensuring that the coupling is zero if the qubits 102, 104 and the coupler 106 are sufficiently far detuned. The interaction term $H_{XY}=J/2(\sigma_x^{(1)}\sigma_x^{(2)}+\sigma_y^{(1)}\sigma_y^{(2)})$ can essentially be neglected and leads only to a slight correction of the qubit frequency and the transition rates.

One way to activate a coupled two-qubit gate is by tuning the qubits on resonance with each other. In this case, the qubits have to be tunable in frequency, which is typically achieved by making the qubits susceptible to magnetic fields. This procedure introduces an extra loss channel which degrades the coherence time of the qubits.

In contrast, with the new gate 100 the qubits 102, 104 are static and the interaction is activated by modulating the frequency of the tunable coupling qubit 106. By modulating the coupling $$J \to J(t) = J_0(A + B \cos \delta_{12} t) \quad [2]$$

harmonically at the frequency detuning of the qubits $\delta_{12}$, the interaction term obtains a time-independent term in the rotating frame of the modulation. The coupling term can be modulated by changing the frequency of the tunable coupler 106 via an externally applied flux threading its SQUID loop. This externally applied flux modifies the effective Josephson energy $$E_{Jeff} = E_{Jmax}\left|\cos\left(\frac{\pi\phi}{\Phi_0}\right)\right| \quad [3]$$

which relates to the frequency as $$\omega_{tc}=\sqrt{8E_C E_{Jeff}}-E_C \quad [4]$$

in the limit of large $E_{Jeff}$ over the charging energy $E_C$. By selecting the frequency of the modulation accordingly, either a transverse coupling $\propto \sigma_x^{(1)}\sigma_x^{(2)}+\sigma_y^{(1)}\sigma_y^{(2)}$ when driving at the difference frequency $\delta_{12}$ of the qubits, or a longitudinal coupling $\propto \sigma_z^{(1)}\sigma_z^{(2)}$ when driving at another frequency can be activated. The addressability of the interaction is very good as with standard microwave equipment it is simple to choose frequency very accurately. Moreover, unwanted frequency components occurring at multiples of the modulation frequency due to the non-linear functional dependence of the coupling J(t) on the flux $\phi(t)$ can be mitigated by using arbitrary waveform generators.

With the transverse coupling, a SWAP gate related to the (XY) interaction term $\sigma_x^{(1)}\sigma_x^{(2)}+\sigma_y^{(1)}\sigma_y^{(2)}$ can be carried out, which swaps the excitation between the qubits at a rate $\beta J_0$, where $J_0$ is the bare coupling strength (J-coupling term with the qubits in the idle position) and $\beta=(J_{max}-J_{min})/J_0$ is the modulation of this coupling by varying the frequency of the tunable coupler $\omega_{tc}$.

For the typical parameter range used in current experiments (qubit frequencies $\omega_1/2\pi$=4.5 GHZ and $\omega_2/2\pi$=5 GHz, a maximal tunable coupler frequency $\omega_{tc}/2\pi$=6.5 GHz below the readout resonators and a minimal detuning between qubit and tunable coupler $\delta_{itc}=g_i/0.15$ (i=1,2) to remain in the dispersive regime) an optimal tunable coupler has a qubit coupling strength $g_i/2\pi\approx 120$ MHz and a coupling rate $\Delta J/2\pi=\beta J_0/2\pi\approx 6$ MHz corresponding to a full oscillation within $$t = \frac{\pi}{\Delta J} \approx 80 \text{ ns}$$

and an entangling gate duration of about 20 ns.

In addition, because of the anharmonic character of the transmon qubits 102, 104 and the presence of higher energy levels, an extra longitudinal (ZZ) coupling term $J_{zz}\sigma_z^1\sigma_z^2$ with $J_{zz}=\Delta J^2\alpha/(\alpha^2-\delta_d^2)$ emerges. Here $\alpha$ is the anharmonicity of the qubits $$\left(\frac{\alpha}{2\pi} \approx 300 \text{ MHz in current devices}\right)$$

and $\delta_d$ is the detuning of the modulation from the qubit-qubit detuning $\delta_{12}$ This term commutes with the XY interaction term and can, therefore, be compensated either by spin echo techniques or by slightly shifting the frequency of the modulation. The new gate allows for frequency differences of interacting qubits that are significantly larger than their anharmonicity, on the order of GHz, thus reducing the requirements on fabrication tolerances of the Josephson tunnel junction which determines the frequency of the qubits.

The longitudinal term can in turn be used to activate a longitudinal qubit-qubit interaction corresponding to a conditional phase gate by modulating the coupling at a detuned frequency. This term can be regarded as a two-qubit stark shift term. The strength of the coupling $J_{zz} = \Delta J^2 \alpha/(\alpha^2 - \delta_d^2)$ is regulated via the detuning $\delta_d$ of the modulation frequency from the qubit-qubit detuning.

The coupler may be used as a microwave activated reset mechanism by designing the coupler to couple to an external environment and by microwave driving the coupling to effectively cool and reset the qubits. Instead of a second transmon, a low quality factor resonant circuit, e.g., another low-coherence transmon, can be used. With the same mechanism, excitations can be swapped to the low-coherence transmon and will then be lost. In this way, for example, initial thermal excitations of the qubit can be dumped into the environment to effectively cool the qubit. Another application is, if the qubit is in the excited state, and needs to be reset to its ground state. In the same way, one can probe the presence of other spurious modes, i.e. unwanted or not detectable resonances in the device, by scanning the frequency of the coupler modulation and detecting swaps from the transmon into these other modes.

Figure 3:
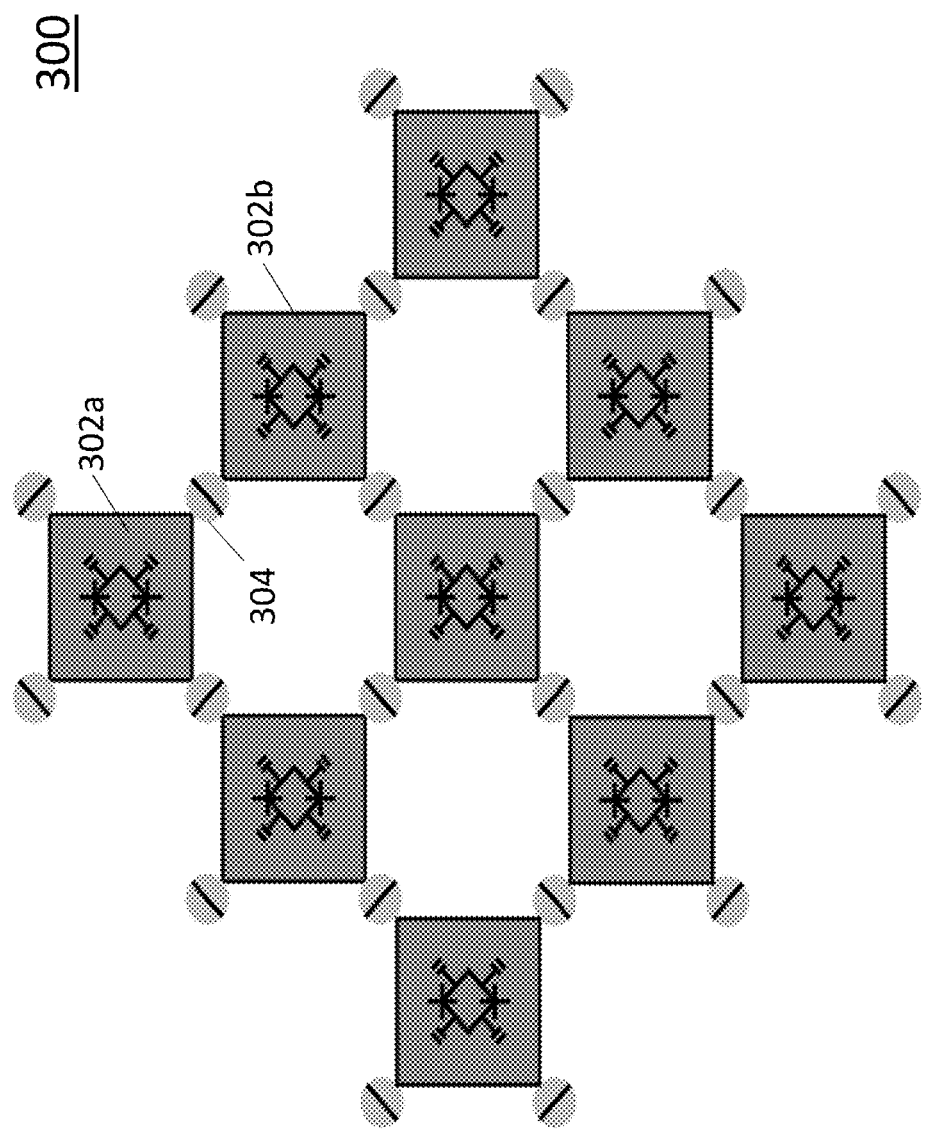
FIG. 3 is an example of a two dimensional lattice of interacting qubits interconnected via tunable coupling elements coupling to four qubits each in accordance with one embodiment of the present disclosure.

The tunable coupling element 104 can be designed to couple capacitively to more than two qubits, as shown in FIG. 3, which shows an example of a 2D lattice 300 of interacting qubits 302 interconnected via tunable coupling elements 304 coupling to two two-qubit gates (i.e. four qubits each (e.g., 302a, 302b)). This configuration realizes a square lattice of an interacting spin model with XYZ interaction between nearest neighbor qubits. The qubits 102, 104 are detuned in their idle state, such that the interaction is essentially switched off. By modulating the frequency of the tunable coupler 106, a pairwise qubit-qubit interaction can be switched on by driving at the difference frequency between the selected qubits. Stark-shifts and $\sigma_z \sigma_z$ terms can be compensated by synchronously driving at other frequencies with appropriately chosen amplitude In combination with single qubit gates, a universal set for quantum computation may be generated. Both the i-SWAP gate and the conditional phase (C-Phase) gate are Clifford operation and error correction codes like the surface code can be easily implemented with this set, thereby allowing an architecture for universal quantum computing.

In addition to applications in quantum computation architecture, this interaction is also of interest for analog quantum simulations, where it is important to realize a system Hamiltonian that mimics the Hamiltonian one wants to simulate. A particular interesting model to study is the Heisenberg model for an ensemble of interacting spin. This model is, for example, used to describe quantum magnetism or to describe high-TC superconductivity. In its general form, the Heisenberg Hamiltonian is given by $$H = \Sigma_{<i,j>} (J_{xx} \sigma_x^{(i)} \sigma_x^{(j)} + J_{yy} \sigma_y^{(i)} \sigma_y^{(j)} + J_{zz} \sigma_z^{(i)} \sigma_z^{(j)}), \quad [5]$$

where the sum is over neighboring spins <i, j>, $J_{xx}$, $J_{yy}$, and $J_{zz}$ are the interactions along the respective axes x, y and y and $\sigma_{x,y,z}^{(j)}$ denotes the usual Pauli matrices for spin j. A quantum simulation of this Hamiltonian has been performed with circuit QED in a digital manner by decomposing the interaction Hamiltonian into a sequence of single and two-qubit operations. With the proposed gate scheme, the Hamiltonian can be directly realized (with $J_{xx} = J_{yy}$) by activating the transverse and the longitudinal coupling. The underlying two dimensional lattice structure of the interacting spins can be designed at will, for example as a 2D square array lattice 300, as shown in FIG. 3.

The architecture and interaction described here builds on well-established basis elements and can be used as a primitive for both quantum computing and quantum simulation.

Non-Limiting Embodiments

It should be noted that some features of the present invention may be used in an embodiment thereof without use of other features of the present invention. As such, the foregoing description should be considered as merely illustrative of the principles, teachings, examples, and exemplary embodiments of the present invention, and not a limitation thereof.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The methods as discussed above are used in the fabrication of integrated circuit chips.

The resulting integrated circuit chips can be distributed by the fabricator in raw wafer form (that is, as a single wafer that has multiple unpackaged chips), as a bare chip, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products (such as, but not limited to, an information processing system) having a display, a keyboard, or other input device, and a central processor.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Further, the terms and phrases used herein are not intended to be limiting; but rather, to provide an understandable description of the invention.

The terms "a" or "an", as used herein, are defined as one as or more than one. The term plurality, as used herein, is defined as two as or more than two. Plural and singular terms are the same unless expressly stated otherwise. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A coupling mechanism comprising:
   two qubits that are detuned in an idle state such that an interaction between the two qubits is switched off; and
   a tunable coupling qubit that activates the interaction between the two qubits by modulation of a frequency of the tunable coupling qubit at a difference frequency between the two qubits that is at least 1 GHz larger than an anharmonicity of the two qubits.

2. The coupling mechanism of claim 1, wherein the tunable coupling qubit capacitively couples the two qubits.

3. The coupling mechanism of claim 1, wherein the tunable coupling qubit is coupled to the two qubits by two electrodes separated by a superconducting quantum interference device loop having two Josephson junctions.

4. The coupling mechanism of claim 1, wherein the tunable coupling qubit is coupled to the two qubits by a single electrode with a superconducting quantum interference device loop coupling to ground.

5. The coupling mechanism of claim 1, wherein the superconducting quantum interference device loop is used to control an inductively-coupled flux bias line positioned such that capacitive coupling to two electrodes of the tunable coupling qubit is symmetric.

6. The coupling mechanism of claim 1, wherein the exchange-type interaction swaps an excitation between the two qubits.

7. The coupling mechanism of claim 1, wherein the exchange-type interaction induces a state-dependent phase shift on one of the two qubits.

8. The coupling mechanism of claim 1, wherein the tunable coupling qubit produces a coupling of the two qubits having a strength dependent upon an amplitude of the modulation frequency and a phase dependent upon a phase of the modulation frequency.

9. The coupling mechanism of claim 1, wherein the two qubits are transmon type qubits.

10. The coupling mechanism of claim 1, wherein the two fixed-frequency qubits are initially decoupled.

11. The coupling mechanism of claim 1, wherein the two fixed-frequency qubits are symmetrically positioned mirror qubits and the tunable coupling qubit is positioned between the two qubits.

12. The coupling mechanism of claim 1, wherein the two qubits are fixed-frequency qubits.

13. A method of activating a coupling mechanism comprising:
    positioning a tunable coupling qubit between two qubits; and
    modulating a frequency of the tunable coupling qubit at a difference frequency between the two qubits that is at least 1 GHz larger than an anharmonicity of the two qubits.

14. The method of claim 13, wherein the tunable coupling qubit is modulated at a difference frequency of the two qubits.

15. The method of claim 13, wherein the tunable coupling qubit is coupled to the two qubits by two electrodes separated by a superconducting quantum interference device loop having two Josephson junctions.

16. The method of claim 13, further comprising using the coupling mechanism as a basis of a universal quantum computer that uses error correction.

17. The method of claim 13, further comprising using the coupling mechanism as a platform for quantum simulation of systems interacting based on a lattice of qubits connected via coupling elements mediating interactions between nearest neighbor pairs of qubits.

18. The method of claim 17, wherein the systems are interacting via a Heisenberg XYZ interaction.

19. The method of claim 13, wherein one of the two qubits is a low-coherence transmon, the method further comprises swapping excitations to the low-coherence transmon such that initial thermal excitations of the low-coherence transmon are transferred into a surrounding environment to cool the qubit.

20. The method of claim 13, wherein one of the two qubits is in an excited state, the method further comprises resetting the one of the two qubits to its ground state.

21. A square lattice comprising:
    a plurality of unit cells, each unit cell comprising:
        two or more qubits, wherein a pair of qubits of the two or more qubits are detuned in an idle state such that an interaction between the pair of qubits is switched off; and
        a tunable coupling qubit that activates the interaction between a pair of qubits of the two or more qubits by modulation of a frequency of the tunable coupling qubit at a difference frequency between the pair of qubits that is at least 1 GHz larger than an anharmonicity of the two qubits.

22. A quantum gate comprising:
    two superconducting qubits that are detuned in an idle state such that an interaction between the two superconducting is switched off; and
    a tunable coupling qubit that activates an interaction between the two superconducting qubits by modulation of a frequency of the tunable coupling qubit at a difference frequency between the two superconducting qubits that is at least 1 GHz larger than an anharmonicity of the two qubits.

* * * * *